(12) United States Patent
Gopalakrishnan et al.

(10) Patent No.: US 7,110,466 B1
(45) Date of Patent: Sep. 19, 2006

(54) VARIABLE RATE MESSAGE CODING

(75) Inventors: Nandu Gopalakrishnan, Chatham, NJ (US); Ashok N. Rudrapatna, Basking Ridge, NJ (US); Ganapathy Subramanian Sundaram, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1255 days.

(21) Appl. No.: 09/587,727

(22) Filed: Jun. 5, 2000

(51) Int. Cl.
*H04L 27/04* (2006.01)
(52) U.S. Cl. ................................ 375/295
(58) Field of Classification Search ............... 375/295; 341/65, 67; 370/395.4, 395.42
See application file for complete search history.

(56) References Cited

U.S. PATENT DOCUMENTS

| | | | | |
|---|---|---|---|---|
| 5,233,348 A | * | 8/1993 | Pollmann et al. ............ | 341/67 |
| 5,541,595 A | * | 7/1996 | Meyer .......................... | 341/67 |
| 5,822,318 A | | 10/1998 | Tiedemann, Jr. et al. ... | 370/391 |
| 5,909,434 A | | 6/1999 | Odenwalder et al. ....... | 370/342 |
| 6,411,799 B1 | * | 6/2002 | Padovani ..................... | 455/69 |
| 2001/0012271 A1 | * | 8/2001 | Berger ......................... | 370/230 |
| 2002/0057742 A1 | * | 5/2002 | Masuo .................. | 375/240.23 |

FOREIGN PATENT DOCUMENTS

WO  WO 97/03403  1/1997

* cited by examiner

*Primary Examiner*—Kevin Burd

(57) ABSTRACT

The present invention provides a method for encoding messages. The method includes identifying at least a first plurality of messages indicative of a corresponding first plurality of data transmission rates and a second plurality of messages indicative of a corresponding second plurality of data transmission rates based on a prior transmitted message, where the first and second pluralities of messages are unequal. The method also includes transmitting a message from one of at least the first and second pluralities of messages.

19 Claims, 4 Drawing Sheets

| CURRENT SYS. STATE (RATE IN PRIOR MSG) 90 | 92 | 94 | 96 | 98 |
|---|---|---|---|---|
| PRIOR MSG | 1 Bit msg. (UP TO 2 MSGS) | 2 Bit msg. (UP To 4 MSGS) | 3 Bit msg. (UP TO 8 MSGS) | 4 Bit msg. (UP TO 16 MSGS) |
| R1 | R1/R2 | R3/R4/R5/R6 | R7/.../R14 | refresh |
| R2 | R2/R3 | R 1/R4/R5/R6 | R7/.../R14 | refresh |
| R3 | R3/R4 | R1/R2/R5/R6 | R7/.../R14 | refresh |
| R4 | R4/R5 | R2/R3/R6/R7 | R8/.../R14/R1 | refresh |
| R5 | R5/R6 | R3/R4/R7/R8 | R9/.../R14/R1/R2 | refresh |
| R6 | R6/R7 | R4/R5/R8/R9 | R10/.../R14/R1/.../R3 | refresh |
| R7 | R7/R8 | R5/R6/R9/R10 | R11/.../R14/R1/.../R4 | refresh |
| R8 | R8/R9 | R6/R7/R10/R11 | R12/.../R14/R1/.../R5 | refresh |
| R9 | R9/R10 | R7/R8/R11/R12 | R13/R14/R1/.../R6 | refresh |
| R10 | R10/R11 | R8/R9/R12/R13 | R14/R1/.../R7 | refresh |
| R11 | R11/R12 | R9/R10/R13/R14 | R1/.../R8 | refresh |
| R12 | R12/R13 | R9/R10/R11/R14 | R1/.../R8 | refresh |
| R13 | R13/R14 | R9/R10/R11/R12 | R1/.../R8 | refresh |
| R14 | R14/R13 | R9/R10/R11/R12 | R1/.../R8 | refresh |

| PRIOR MSG | 1 Bit msg. (UP TO 2 MSGS) | 2 Bit msg. (UP To 4 MSGS) | 3 Bit msg. (UP TO 8 MSGS) | 4 Bit msg. (UP TO 16 MSGS) |
|---|---|---|---|---|
| | CURRENT SYS. STATE (RATE IN PRIOR MSG) | | | |
| R1 | R1/R2 | R3/R4/R5/R6 | R7/../R14 | refresh |
| R2 | R2/R3 | R1/R4/R5/R6 | R7/../R14 | refresh |
| R3 | R3/R4 | R1/R2/R5/R6 | R7/../R14 | refresh |
| R4 | R4/R5 | R2/R3/R6/R7 | R8/../R14/R1 | refresh |
| R5 | R5/R6 | R3/R4/R7/R8 | R9/../R14/R1/R2 | refresh |
| R6 | R6/R7 | R4/R5/R8/R9 | R10/../R14/R1/../R3 | refresh |
| R7 | R7/R8 | R5/R6/R9/R10 | R11/../R14/R1/../R4 | refresh |
| R8 | R8/R9 | R6/R7/R10/R11 | R12/../R14/R1/../R5 | refresh |
| R9 | R9/R10 | R7/R8/R11/R12 | R13/R14/R1/../R6 | refresh |
| R10 | R10/R11 | R8/R9/R12/R13 | R14/R1/../R7 | refresh |
| R11 | R11/R12 | R9/R10/R13/R14 | R1/../R8 | refresh |
| R12 | R12/R13 | R9/R10/R11/R14 | R1/../R8 | refresh |
| R13 | R13/R14 | R9/R10/R11/R12 | R1/../R8 | refresh |
| R14 | R14/R13 | R9/R10/R11/R12 | R1/../R8 | refresh |

FIG. 5

| PRIOR MSG | 1 Bit msg. | 2 Bit msg. | 3 Bit msg. | 4 Bit msg. |
|---|---|---|---|---|
| | CURRENT SYS. STATE (RATE IN PRIOR MSG) | | | |
| R4 | R4/R5 | R2/R3/R6/R7 | R8/../R14/R1 | refresh |
| | 0/1 | 00/01/10/11 | 000/..../110/111 | 0001/0010/..../1110 |

VARIABLE RATE MESSAGE CODING

BACKGROUND OF THE INVENTION

1. Field of the Invention

The present invention relates to communications; more specifically, message encoding.

2. Description of the Related Art

FIG. 1 illustrates a typical cellular based wireless communication system. Communications from base station 10 to mobile stations 12, 14 and 16 are transmitted using downlink channels 18, 20 and 22, respectively. Similarly, communications from mobile stations 12, 14 and 16 to base station 10 are transmitted using uplink channels 24, 26 and 28, respectively.

FIG. 2 illustrates a downlink data communication channel having time slots 40, 42, 44 and 46. The data transmitted in each of the slots may be transmitted at one of several standard rates. For example, slot 40 contains data transmitted at rate R1, slot 42 has data transmitted at rate R2, slot 44 has data transmitted at rate R5 and slot 46 has data transmitted at rate R12. The rate used to transmit data in each slot is chosen based on a request made by the mobile station that will be receiving the data. For example, while a mobile is receiving data at rate R1 during time slot 40, the mobile is also monitoring communication channel conditions by measuring, for example, a carrier to interference ratio. Based on that measurement, the mobile station transmits a data rate request to base station 10 before the end of slot 40 so that the base station can transmit at the new rate during slot 42. If, for example, the carrier to interference ratio has increased indicating improving channel conditions, the mobile will request rate R2 for the next time slot where rate R2 is a higher data rate than rate R1. Similarly, if during slot 42 the carrier to interference ratio improves significantly, the mobile may ask for a rate increase to rate R5 for slot 44. The number of bits used to specify the new rate depends on the number of standard rates that are available. In a proposed communication system known as HDR (High Data Rate), 14 different data rates are available, therefore the request requires four bits.

FIG. 3 illustrates an uplink control channel known as the pilot/DRC (data rate control channel). The pilot/DRC channel is transmitted by the mobile to provide the base station with a pilot signal that the base station uses to demodulate other transmissions from the mobile to the base station. The pilot/DRC is also used to provide the base station with data rate request information from the mobile. The pilot and data rate request information are alternated using equal amounts of time. For example, time slot 60 is used to transmit pilot signal while time slot 62 is used to transmit bit $B_1$ of a data rate request message. Slot 64 is then used to transmit pilot information while slot 66 is used to transmit bit $B_2$ of the data rate request message. Slot 68 is used to transmit pilot signal, and slot 70 is used to transmit bit $B_3$ of the data rate request message. Similarly, slot 72 is used to transmit pilot signal while slot 74 is used to transmit bit $B_4$ of the data rate request message. This pattern repeats until another data rate request message is sent where bits $B_1$, $B_2$, $B_3$ and $B_4$ of prior data rate request message are replaced with four bits specifying the new rate.

The height of each slot indicates the power level used to transmit the information in the slot. It should be noted that the pilot and data rate request bits are transmitted at the same power level. As a result, 50% of the power in the pilot/DRC channel is associated with data rate request messages. Generally, any overhead or control channel such as a pilot/DRC channel increases the overall noise in a communication system and thereby adversely affects the quality of the voice or data communication channels. Therefore, it is desirable to reduce the amount of power in overhead or control channels.

SUMMARY OF THE INVENTION

The present invention reduces the power in overhead or control channels by reducing the number of bits required to represent a data rate request message. This is done by specifying the data request message based on a prior message or a known system state, such as the current data rate used in a communication channel. Since less bits are used to transmit the data request message, the bits can be repeated more frequently and as a result, transmitted at a lower power. Transmitting the data rate request bits at a lower power reduces the power associated with the control channel used to carry the bits and thereby reduces the overall noise in the communication system.

In one embodiment, a prior message is used to identify groups of messages that may be used for transmission. The groups of messages contain different numbers of messages, so as a result, messages from smaller groups may be represented using less bits than messages from larger groups. The smallest group contains messages with the highest probability of being sent; therefore, the probability of using a message represented by a smaller number of bits is maximized. Messages from different groups are transmitted at different power levels to enable a receiver to determine the message group. As a result, a receiver uses the prior message, the power level associated with a received message and the received message bits to identify a message.

In another embodiment, a known or current system state, rather than a prior message, is used to identify groups of messages that may be used for transmitting or receiving.

BRIEF DESCRIPTION OF THE DRAWINGS

FIG. 4 illustrates a message table identifying groups of messages based on a prior message;

FIG. 5 illustrates the bit assignments that may be used to transmit a data rate request message within each message group;

DETAILED DESCRIPTION OF THE INVENTION

Figure 1:
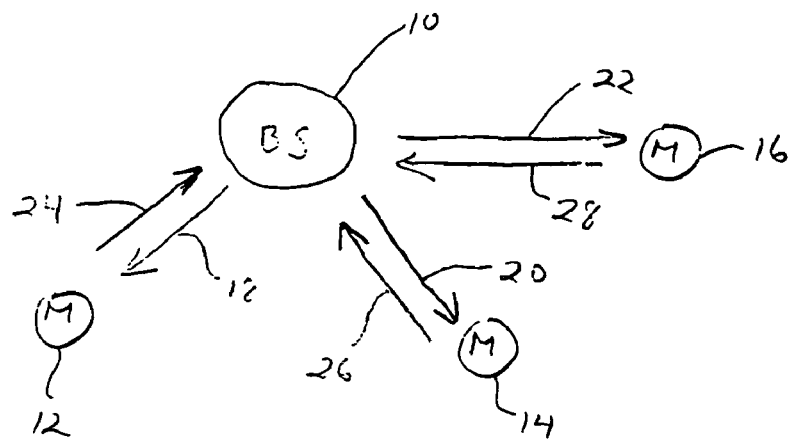
FIG. 1 illustrates a typical cellular based wireless communication system.
Figure 2:
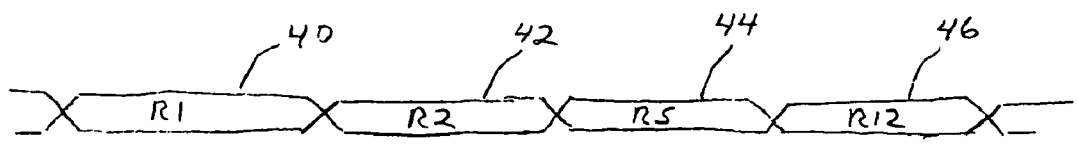
FIG. 2 illustrates a downlink data communication channel having time slots.
Figure 3:
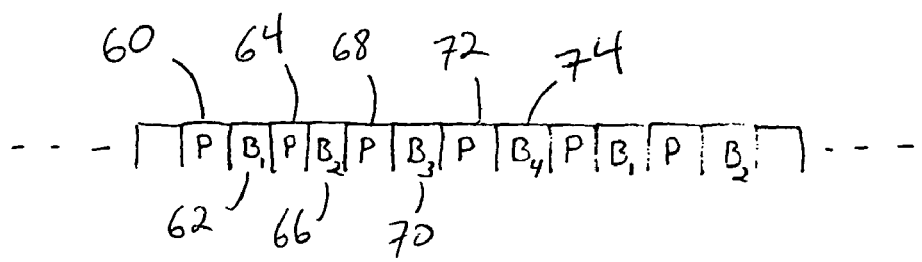
FIG. 3 illustrates an uplink control channel known as the pilot/DRC (data rate control channel)

FIG. 4 illustrates a message table identifying groups of messages based on a prior message or current system state. Column 90 indicates the prior message, or in the case of a data rate control message, the rate specified in the prior rate message. It should be noted that in this example the rate specified in the prior rate message is also the current system state because the data communication rate currently being used was specified in the prior message. Column 92 contains groups of one-bit messages, column 94 contains groups of two-bit messages, column 96 contains groups of three-bit messages, and column 98 contains groups of four-bit messages. In this example, we are again assuming that there are 14 possible standardized messages or data rates. As a result, a refresh would use four bits to specify the data rate.

Groups of messages associated with a prior message or system state are identified by reading across the row associated with the prior message or system state. For example, if the prior message data rate was rate R4, the information in row 100 is used to identify message groups and the number of bits used to represent messages in each group. If the request is to specify that the next data rate is to be data rate R4 or R5, a one-bit message is used. If the request is to specify that the data rates R2, R3, R6 or R7 are to be used, a two-bit message is sent. If data rates R8 through R14 or R1 are to be specified, a three-bit message is sent. A four-bit message is sent when a refresh is required. A refresh may be required when a communication channel is first established or when an error occurs such that the mobile requests one rate and the base station responds with an unexpected rate.

The different messages or rates are grouped according to probabilities. For example, if the prior rate message or current system state was R4, it is most probable that the next request will be either R4 or R5. As a result, it is most probable that the next data rate request message will make a request for R4 or R5. In order to minimize the number of bits sent to specify the next message, R4 and R5 should be associated with a one-bit message. The next most probable rate request messages would be R2, R3, R6 or R7. As a result, those rate messages are grouped together in the two-bit messages. The next most probable rate request message would be R8 through R14 or R1. As a result, they are included in the three-bit messages. The least likely message to be sent would be a total refresh, therefore, four bits are used for that message. It should be noted that the lowest bit message is the message having the highest probability of being sent based the most recently sent message. By grouping these messages according to these probabilities, it is more likely that lower bit messages will be sent frequently.

FIG. 5 illustrates the bit assignments that may be used to transmit a message such as a data rate request message. For example, if R4 is the rate that was specified in the most recent rate request message, a one-bit message is used to transmit a request for rate R4 or R5. In this example, a rate request bit $B_1=0$ is transmitted for R4 and a $B_1=1$ is transmitted for R5. If the next message is to request one of rates R2, R3, R6 or R7, rate request bits $B_1$ and $B_2$ will have the values 00, 01, 10 or 11, respectively. If the next rate request message is to be a three-bit message requesting one of rates R8 through R14 or R1, rate request bits $B_1$, $B_2$ or $B_3$ are encoded with the values 000 for R8 incrementing up to 110 for R14 and 111 for R1. In the case of a four-bit refresh message, data rate control request bits $B_1$ through $B_4$ may simply have the binary equivalent of the rate number. It should be noted that the specific bit value associated with a particular rate may be defined in any consistent fashion.

Figure 6A:
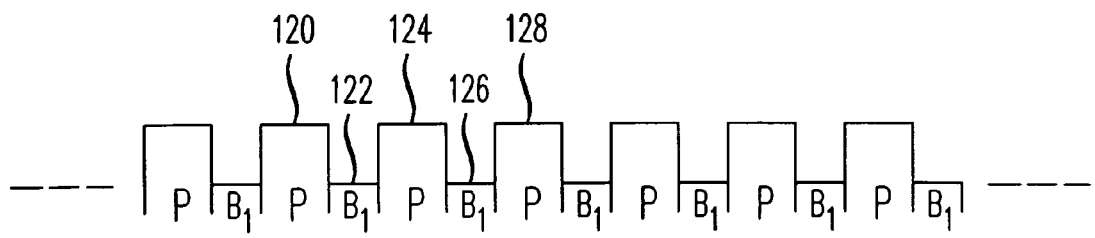
FIG. 6*a* illustrates a pilot/DRC control channel where a one-bit message is sent.

FIGS. 6a, 6b, 6c and 6d illustrates a pilot/DRC control channel. It should be noted that FIGS. 6a, 6b, 6c, and 6d represent a situation where one-, two-, three- and four-bit messages such as data rate messages are sent, respectively. The height of the slot associated with each pilot or data rate message bit indicates the relative power levels used to transmit during the pilot and message bit times. In the case of FIG. 6a, a one-bit message is being sent such that slot 120 is used to transmit a pilot signal and slot 122 is used to transmit a signal representation of bit $B_1$ of the one-bit message specifying data rate request. It should be noted that the signal representative of bit $B_1$ is transmitted at approximately 25% of the power level of the pilot signal in slot 120. This sequence is continued through slots 124, 126, 128 and so on until a new data rate control message is to be sent.

Figure 6B:
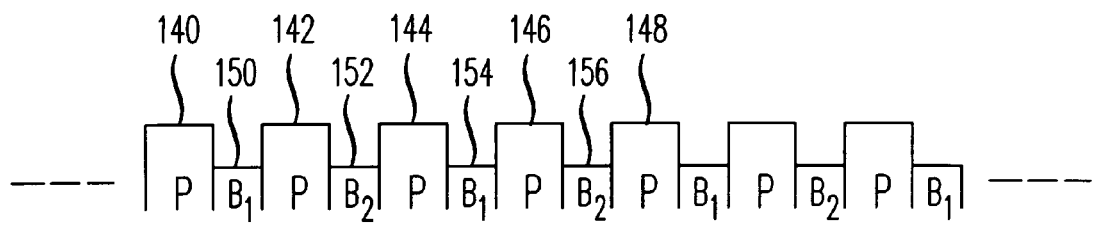
FIG. 6*b* illustrates a pilot/DRC control channel where a two-bit message is sent.

FIG. 6b illustrates a situation where a two-bit message such as a data rate control message is sent. In this situation, a pilot signal is sent in slots 140, 142, 144, 146 and 148. Signals representative of message bits are sent in the alternating slots where bit $B_1$ is sent in slot 150, bit $B_2$ is sent in slot 152, bit $B_1$ is once again sent in slot 154 and bit $B_2$ is once again sent in slot 156. This pattern continues until a new message is to be sent. It should be noted that that signals representing the data rate request bits $B_1$ and $B_2$ are transmitted at approximately 50% of the power level of the pilot signal.

Figure 6C:
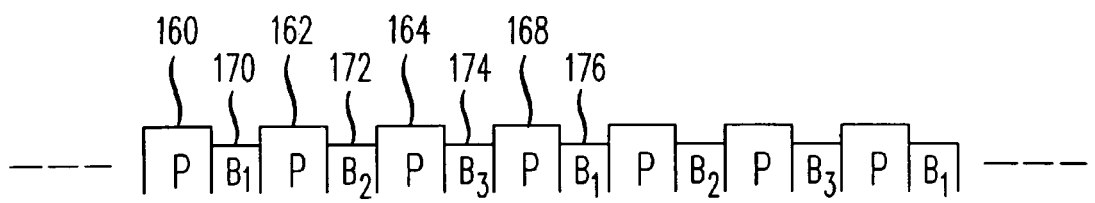
FIG. 6*c* illustrates a pilot/DRC control channel where a three-bit is sent.

FIG. 6c illustrates a situation where a three-bit message such as a data rate control message is sent where slots 160, 162, 164, 166 and 168 are used to transmit the pilot signal. The alternating slots are then used to transmit signals representative of the data rate control bits where slot 170 is used to transmit bit $B_1$, slot 172 is used to transmit bit $B_2$, slot 174 is used to transmit bit $B_3$ and slot 176 is used to transmit bit $B_1$ again. This pattern continues until a new data rate control message is to be sent. It should be noted that signals representing the message bit are transmitted at approximately 75% of the power level of the pilot signal.

Figure 6D:
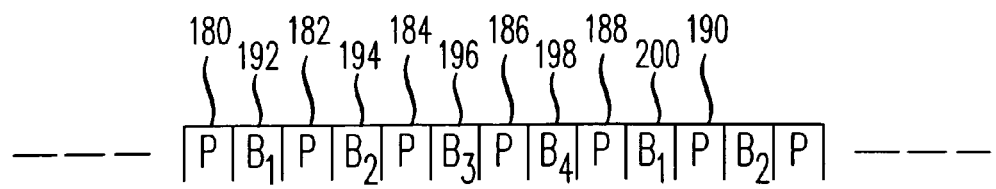
FIG. 6*d* illustrates a pilot/DRC control channel where a four-bit message is sent.

FIG. 6d illustrates a situation where a four-bit message is being sent as a data request message. In this case, time slots 180, 182, 184, 186, 188 and 190 are used for the pilot signal. Slot 192 is used for message bit $B_1$, slot 194 is used for message bit $B_2$, slot 196 is used for message bit $B_3$, slot 198 is used for message bit $B_4$ and slot 200 is used for message bit $B_1$ once again. This pattern then continues until a new message is to be sent. In this case it should be noted that the signals representing the message bits are sent at the same power level as the pilot signal.

The base station or receiver that is to decode a message such as the data rate request bits uses the power level of the signal representing a message bit to determine which of the message groups identified by the prior message or current system state is being received. As a result, the receiver may distinguish whether a one-, two-, three- or four-bit message is being received. The power level may be relative to another signal's power such as the amount of power in a pilot signal or the amount of power is a signal on another channel or frequency. In this example, if the message bit is transmitted at a power that is less than 30% of the pilot signal, a one-bit message group is assumed. If the power used to transmit the message bits is between 30 and 60% of the power used to transmit the pilot signal, a two-bit message group is assumed. If the amount of power used to transmit a message bit is greater than 60%, or less than or equal to 85% of the power used to transmit the pilot signal, a three-bit message group is assumed. If the message bits are transmitted at the same power as the pilot signal, a four-bit message group is assumed.

FIGS. 7a, 7b, 7c and 7d illustrates an encoding scheme that is used to increase the reliability of a message such as a data rate message. It should be noted that the message being sent is based on a prior message such as a data request message or on the current system state, therefore, a receiver's ability to correctly identify a new message depends on the accuracy of the prior message. As a result, half-rate encoding is used to increase the reliability of message transmission. In this example, 16 bits are used to transmit a message, however, more or less bits can be used depending on the amount of available channel bandwidth. It should be noted that this example uses Walsh encoding; however, other orthogonal codes may be used.

Figure 7A:
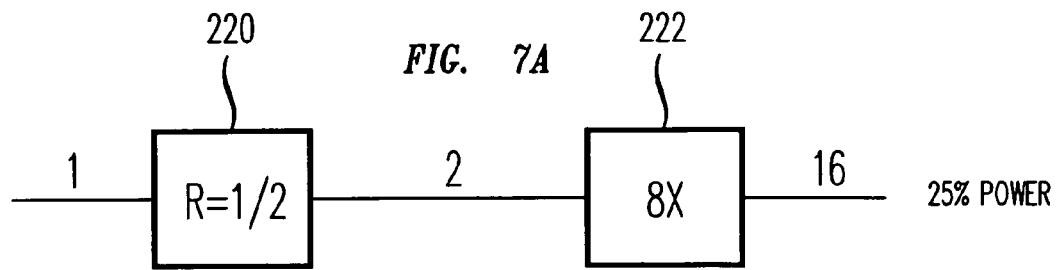
FIG. 7*a* illustrates an encoding scheme that is used to increase the reliability of a one-bit message.

FIG. 7a illustrates the encoding that is used to represent a one-bit message as a 16-bit message. In this case, half rate encoder 220 encodes the one-bit message into a two-bit message. The two-bit message is then repeated eight times by repeater 222 to produce 16 bits that are transmitted. It should be noted that these 16 bits will be sent at one-quarter the power of the pilot signal. The encoding used by encoder 220 may be any well-known half-rate encoding such as Walsh encoding. In the case of Walsh encoding, the one-bit is used to identify which of two different two-bit Walsh codes are sent. In this case, the two Walsh codes are complements of each other. As a result, the one-bit provided to encoder 220 produces a two-bit output. This two-bit output is then repeated eight times by repeater 222 to produce a 16-bit output which is then transmitted as described in FIG. 6a using 25% the power of the pilot signal.

Figure 7B:
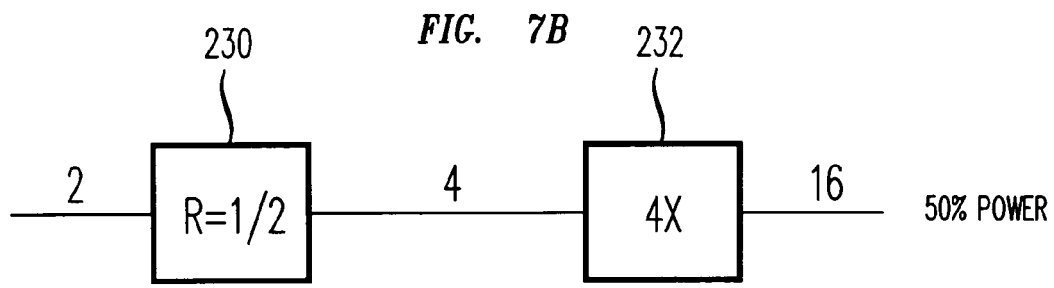
FIG. 7*b* illustrates an encoding scheme that is used to increase the reliability of a two-bit message.

Similarly, FIG. 7b illustrates encoder 230 which is a half-rate Walsh encoder output; however, other well-known half-rate encoders may be used. When the two-bit message is provided to the encoder, it produces a four-bit output by selecting one of four different four-bit Walsh codes. It should be noted that the four Walsh codes consist of a first Walsh code and its complement and a second Walsh code and its complement. The output of encoder 230 is then repeated four times by repeater 232 to produce 16 output bits which are then transmitted as described in FIG. 6b using 50% the power used to transmit pilot signal.

Figure 7C:
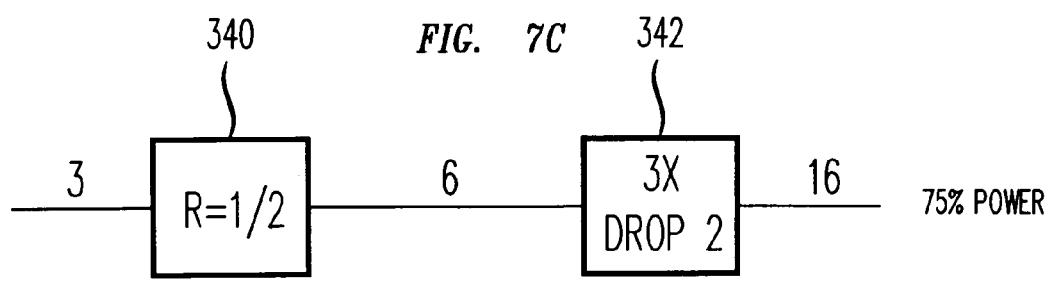
FIG. 7*c* illustrates an encoding scheme that is used to increase the reliability of a three-bit message.

Similarly, FIG. 7c illustrates a three-bit message being provided to encoder 340 which uses Walsh encoding to produce a six-bit output; however, other well-known half-rate encoders may be used. The six bits produced by encoder 340 are then repeated three times by repeater 342 where the last two bits are dropped to produce a 16 bit output. The 16 bits are then transmitted as described in FIG. 6c using 75% of the power sued to transmit the pilot signal.

Figure 7D:
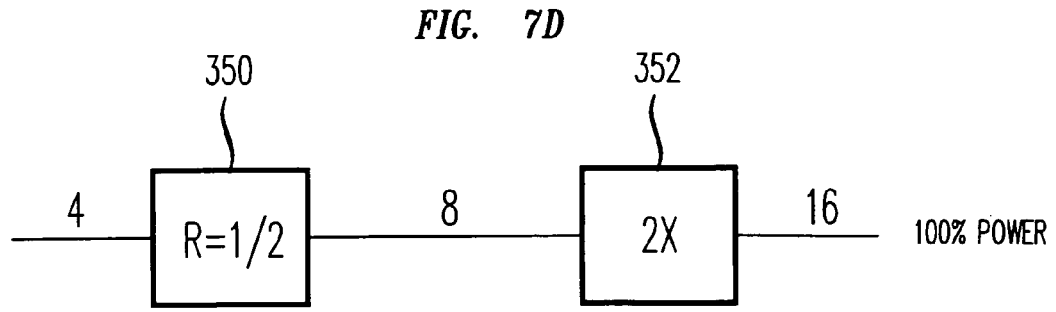
FIG. 7*d* illustrates an encoding scheme that is used to increase the reliability of a four-bit message.

FIG. 7d illustrates the encoding of a four-bit message where four bits are provided to half-rate Walsh encoder 350; however, other well-known half-rate encoders may be used. The four bits are used to select one of 16 different eight-bit Walsh codes. In this example, the 16 Walsh codes are Walsh codes 1 through 8 and the complements of each of the Walsh codes. The eight bits from half-rate encoder 350 are then provided to repeater 352 which repeats the eight bits twice to produce a 16-bit output. As discussed with regard to FIG. 6d, the bits produced by repeater 352 are transmitted at 100% of the pilot signal power.

It should be noted that the encoding of FIG. 7 is not required and is used to increase the reliability of the message. When the encoding of FIG. 7 is used, the transmitted signal is decoded using half-rate decoders to produce the message bits at the receiver.

The invention claimed is:

1. A method for encoding messages, comprising the steps of:

identifying at least a first plurality of messages indicative of a corresponding first plurality of data transmission rates and a second plurality of messages indicative of a corresponding second plurality of data transmission rates based on a prior transmitted message, where the first and second pluralities of messages are unequal; and transmitting a message from one of at least the first and second pluralities of messages.

2. The method of claim 1, wherein a first number of bits used to represent messages in the first plurality of messages is different than a second number of bits used to represent messages in the second plurality of messages, where the first and second number of bits are at least equal to one.

3. The method of claim 1, wherein a message from the first plurality of messages has a higher probability of being transmitted than a message from the second plurality of messages.

4. The method of claim 3, wherein a first number of bits used to represent messages in the first plurality of messages is less than a second number of bits used to represent messages in the second plurality of messages, the first number of bits being at least equal to one.

5. A method for encoding messages, comprising the steps of:

identifying at least a first plurality of messages indicative of a corresponding first plurality of data transmission rates and a second plurality of messages indicative of a corresponding second plurality of data transmission rates based on a prior transmitted message, where the first and second plurality are unequal; and transmitting a message from one of at least the first and second plurality of messages, where a message from the first plurality of messages is transmitted at a different power than a message from the second plurality of messages.

6. The method of claim 5, wherein a first number of bits used to represent messages in the first plurality of messages is different than a second number of bits used to represent messages in the second plurality of messages, where the first and second number of bits are at least equal to one.

7. The method of claim 5, wherein a message from the first plurality of messages has a higher probability of being transmitted than a message from the second plurality of messages.

8. The method of claim 7, wherein a first number of bits used to represent messages in the first plurality of messages is less than a second number of bits used to represent messages in the second plurality of messages, the first number of bits being at least equal to one.

9. The method of claim 8, wherein a message from the first plurality of messages is transmitted using less power than a message from the second plurality of messages.

10. A method for encoding messages, comprising the steps of:

identifying at least a first group of messages having a first plurality of transmit rate request messages and a second group of messages having a second plurality of transmit rate request messages based on a prior transmitted transmit rate request message, where the first and second plurality are unequal; and transmitting a transmit rate request message from one of at least the first and second group of messages by replacing at least a portion of a pilot signal with a signal representing at least a portion of the transmit rate request message.

11. The method of claim 10, wherein a first number of bits used to represent messages in the first group is different than a second number of bits used to represent messages in the second group, where the first and second number of bits are at least equal to one.

12. The method of claim 10, wherein a message from the first group has a higher probability of being transmitted than a message from the second group.

13. The method of claim 12, wherein a first number of bits used to represent messages in the first group is less than a second number of bits used to represent messages in the second group, the first number of bits being at least equal to one.

14. A method for encoding messages, comprising the steps of:
 identifying at least a first group of messages having a first plurality of transmit rate request messages and a second group of messages having a second plurality of transmit rate request messages based on a prior transmitted transmit rate request message, where the first and second plurality are unequal; and
 transmitting a transmit rate request message from one of at least the first and second group of messages by replacing at least a portion of a pilot signal with a signal representing at least a portion of the transmit rate request message, where a message from the first group is transmitted at a different power than a message from the second group.

15. The method of claim 14, wherein a first number of bits used to represent messages in the first group is different than a second number of bits used to represent messages in the second group, where the first and second number of bits are at least equal to one.

16. The method of claim 14, wherein a message from the first group has a higher probability of being transmitted than a message from the second group.

17. The method of claim 16, wherein a first number of bits used to represent messages in the first group is less than a second number of bits used to represent messages in the second group, the first number of bits being at least equal to one.

18. A method of encoding messages comprising the steps of:
 identifying at least a first group of messages having a first plurality of transmit rate request messages and a second group of messages having a second plurality of transmit rate request messages based on a current system state, where the first and second plurality are unequal; and
 transmitting a transmit rate request messages from one of at least the first and second group of messages by replacing at least a portion of a pilot signal with a signal representing at least a portion of the transmit rate request message.

19. A method for encoding messages comprising the steps of:
 identifying at least a first group of messages having a first plurality of transmit rate request messages and a second group of messages having a second plurality of transmit rate request messages based on a current system state, where the first and second plurality are unequal; and
 transmitting a transmit rate request message from one of at least the first and second group of messages by replacing at least a portion of a pilot signal with a signal representing at least a portion of the transmit rate request message, where a message from the first group is transmitted at a different power than a message from the second group.

* * * * *